United States Patent
McCarter

(10) Patent No.: US 9,869,407 B2
(45) Date of Patent: Jan. 16, 2018

(54) METHOD OF SUPPORTING TUBING AND OTHER LINEAR ELEMENTS

(71) Applicant: O'Brien Holding Co., Inc., St. Louis, MO (US)

(72) Inventor: Marcus C. McCarter, Catawissa, MO (US)

(73) Assignee: O'Brien Holding Co., Inc., St. Louis, MO (US)

( * ) Notice: Subject to any disclaimer, the term of this patent is extended or adjusted under 35 U.S.C. 154(b) by 0 days.

(21) Appl. No.: 15/496,823

(22) Filed: Apr. 25, 2017

(65) Prior Publication Data

US 2017/0227143 A1    Aug. 10, 2017

Related U.S. Application Data

(62) Division of application No. 14/716,596, filed on May 19, 2015, now Pat. No. 9,644,766.

(60) Provisional application No. 62/000,958, filed on May 20, 2014, provisional application No. 62/088,543, filed on Dec. 6, 2014, provisional application No. 62/090,778, filed on Dec. 11, 2014.

(51) Int. Cl.

| | |
|---|---|
| *F16L 3/26* | (2006.01) |
| *F16L 3/22* | (2006.01) |
| *F16L 3/13* | (2006.01) |
| *F16L 3/24* | (2006.01) |
| *E04C 3/04* | (2006.01) |

(52) U.S. Cl.
CPC ............... *F16L 3/221* (2013.01); *F16L 3/13* (2013.01); *F16L 3/24* (2013.01); *F16L 3/26* (2013.01); *E04C 3/04* (2013.01)

(58) Field of Classification Search
CPC ... F16L 3/26; F16L 3/221; F16L 3/133; F16L 3/22; F16L 3/13; E04C 3/04; E04C 2003/046; E04C 2003/0452; Y10T 29/49961
See application file for complete search history.

(56) References Cited

U.S. PATENT DOCUMENTS

| | | |
|---|---|---|
| 347,489 A | 8/1886 | Kenway |
| 497,679 A | 5/1893 | Newbury |
| 784,979 A * | 3/1905 | Bruce .................. F16L 3/24 248/72 |

(Continued)

FOREIGN PATENT DOCUMENTS

GB    2049019 A    12/1980

OTHER PUBLICATIONS

AMETEK, Inc., AMETEK product catalog, Mar. 20, 2012, 16 pages, QLT-TPBR-03.

*Primary Examiner* — Babajide Demuren
(74) *Attorney, Agent, or Firm* — Polster Lieder

(57) ABSTRACT

A system of supports for running lengths of tubing between points in a facility independent of wiring carried by cable trays. In an embodiment, each support includes a support assembly including lengths of strut channel and channel clamps secured to the strut channel. In an embodiment, each support includes a generally vertical bar attached to a structural member of the facility, one or two support assemblies clamped to the vertical body, and a removable support bracket carried by at least one of the strut channels. Moveable clamps above the support bracket support lengths of tubing.

8 Claims, 6 Drawing Sheets

(56) References Cited

U.S. PATENT DOCUMENTS

| | | | | |
|---|---|---|---|---|
| 1,470,642 A | * | 10/1923 | Ready | F16L 3/24 104/111 |
| 2,470,992 A | | 5/1949 | Kindorf et al. | |
| 2,567,463 A | | 9/1951 | Atkinson | |
| 2,846,169 A | | 8/1958 | Sullivan | |
| 2,880,949 A | * | 4/1959 | Fuss | F16L 3/227 248/307 |
| 3,528,634 A | * | 9/1970 | Jenkins | F16L 3/10 248/327 |
| 3,547,385 A | | 12/1970 | Kindorf et al. | |
| 3,854,684 A | | 12/1974 | Moore | |
| 4,019,705 A | | 4/1977 | Habuda, Sr. et al. | |
| 4,044,428 A | | 8/1977 | Kowalski | |
| 4,180,228 A | | 12/1979 | Snyder et al. | |
| 5,092,547 A | * | 3/1992 | Richards | F16L 3/133 248/62 |
| 5,100,086 A | | 3/1992 | Rinderer | |
| 5,163,644 A | | 11/1992 | Kowalski | |
| 5,465,929 A | | 11/1995 | Dooley | |
| 5,580,014 A | | 12/1996 | Rinderer | |
| 5,639,048 A | | 6/1997 | Bartholomew et al. | |
| 5,704,571 A | | 1/1998 | Vargo | |
| 5,730,400 A | | 3/1998 | Rinderer et al. | |
| 5,740,994 A | | 4/1998 | Laughlin | |
| 5,871,182 A | | 2/1999 | Johnson et al. | |
| 5,961,081 A | | 10/1999 | Rinderer | |
| 5,969,292 A | | 10/1999 | Snider, Jr. et al. | |
| 6,082,690 A | | 7/2000 | Durin et al. | |
| 6,254,040 B1 | | 7/2001 | McGrath | |
| 6,313,405 B1 | | 11/2001 | Rinderer | |
| 6,354,542 B1 | | 3/2002 | Meyer et al. | |
| 6,520,705 B2 | | 2/2003 | Stasney, Jr. | |
| 6,557,807 B1 | | 5/2003 | Belanger | |
| 6,565,048 B1 | | 5/2003 | Meyer | |
| 6,571,527 B1 | | 6/2003 | Rattini | |
| 6,708,937 B2 | | 3/2004 | Thurman | |
| 7,179,010 B2 | | 2/2007 | Weger et al. | |
| 7,287,728 B2 | | 10/2007 | Shuey | |
| 7,484,697 B1 | | 2/2009 | Nelson | |
| 7,520,476 B2 | | 4/2009 | Caveney et al. | |
| 7,591,442 B2 | | 9/2009 | Dinh et al. | |
| 7,651,056 B2 | | 1/2010 | Tjerrild | |
| 7,837,156 B1 | | 11/2010 | Handler | |
| 8,215,592 B2 | | 7/2012 | Boone | |
| 8,322,661 B2 | | 12/2012 | Oh | |
| 8,424,814 B2 | | 4/2013 | Davis et al. | |
| 8,480,041 B2 | | 7/2013 | Myers | |
| 8,840,071 B2 | | 9/2014 | Oh et al. | |
| 2007/0163748 A1 | | 7/2007 | Rasmussen et al. | |
| 2011/0068232 A1 | | 3/2011 | Steelman | |
| 2013/0214098 A1 | | 8/2013 | Greenfield | |
| 2013/0320157 A1 | * | 12/2013 | Carter | F16L 3/12 248/68.1 |

* cited by examiner

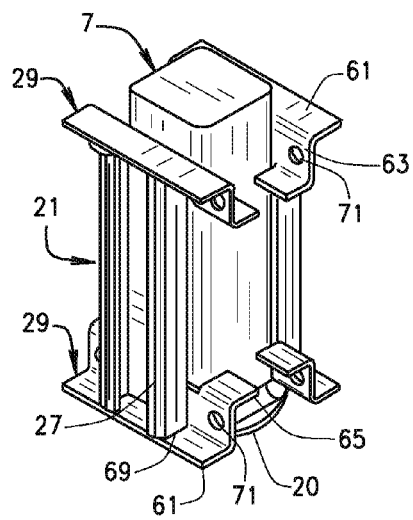
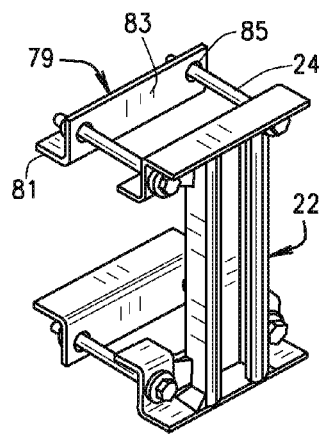
FIG. 4  FIG. 5
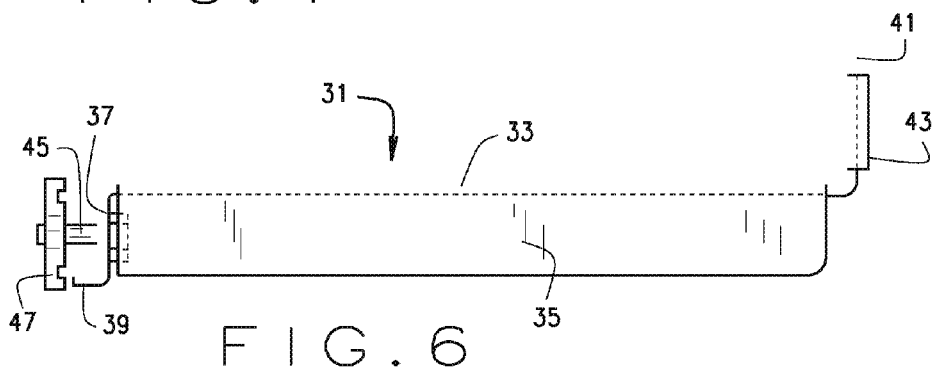
FIG. 6
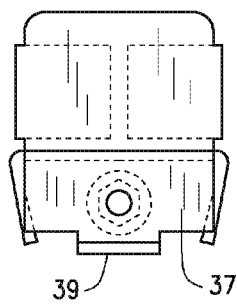
FIG. 7

METHOD OF SUPPORTING TUBING AND OTHER LINEAR ELEMENTS

CROSS-REFERENCE TO RELATED APPLICATIONS

This is a divisional application of U.S. application Ser. No. 14/716,596 filed May 19, 2015, now U.S. Pat. No. 9,644,766, which claims the benefit of U.S. Provisional application 62/000,958, filed May 20, 2014, U.S. Provisional application 62/088,543, filed Dec. 6, 2014, and U.S. Provisional application 62/090,778, filed Dec. 11, 2014, all of which are hereby incorporated by reference in their entirety.

STATEMENT REGARDING FEDERALLY SPONSORED RESEARCH

Not applicable.

BACKGROUND OF THE INVENTION

This invention relates to devices and methods for supporting tubing.

Tubing is utilized in many industrial installations for carrying pneumatic and hydraulic process and control fluids, process chemicals, particulates, and the like. Examples of such tubing are shown in O'Brien/Ametek TRACEPAK brochure QLT-TPBR-03, dated 20 Mar. 2012 and incorporated by reference herein. As shown in this brochure, tubing may be jacketed or unjacketed and may be bundled in various configurations. The bundles are typically round, with tubing clustered around a central long axis, or flat, with tubing arranged with long axes generally in a common plane. As used herein, "tubing" includes both individual tubes and tubing bundles, unless a more limited meaning is clearly indicated.

Numerous systems for carrying cable are known. An example, used for carrying telecommunications cable, is described in Caveney et al., U.S. Pat. No. 7,520,476.

In many situations, including chemical plants and oil platforms, process tubing and electrical cables must be strung over considerable distances. They are presently supported and contained in either an open or closed cable tray. Such cable trays are well known in the field. Ladder-type cable trays and mesh-type cable trays are particularly common. Examples are described in Rinderer, U.S. Pat. No. 6,313,405, Dooley, U.S. Pat. No. 5,465,929, Davis, et al., U.S. Pat. No. 8,424,814, and Boone, U.S. Pat. No. 8,215,592. Cable trays are typically installed before cables and tubing are; the cable trays define pathways through the facility for the cables and tubing.

Present cable tray systems carrying cable and tubing have several problems.

Frequently, space in a cable tray is at a premium. Therefore, the cables and tubing are not kept as neat and accessible as is desirable, and sometimes not everything fits.

Tubing is generally stiffer than cable. Typically, tubing needs to be supported every few feet. Six foot (3'-8') horizontal reaches and fifteen foot (5'-20') vertical reaches are regarded as standard for many common types of tubing, the allowable span varying by tube diameter, wall thickness, and material. Cable is typically supported on 3" to 18" spacings with a ladder-type cable tray and smaller spacings with a mesh cable tray. Therefore, although the tubing does not need to be supported over as short a span as cable, it must share the heavier cable trays necessary to support the cable.

Further, when bent free-form, or by hand, the tubing does not bend on as small a radius as cable, while when bent with a mandrel it may bend on a smaller radius than the cable. Therefore, undesirable compromises and accommodations must be made. Sometimes, the tubing must be bent around too tight a radius, and therefore kinking is a constant danger. Other times to make a tight turn the tubing is spliced, a pre-formed curved section being fit between two straight sections in order to make the small-radius turn required by the cable tray. The splicing introduces field installation complexity. It also risks difficult-to-detect and difficult-to-repair leakage problems and corrosion problems. Other times the cable tray is made with a larger turning radius than would be needed for the cable, thereby making the cable runs longer and more invasive of space than necessary.

Additional bends may be required simply to bring the tubing out of the cable tray.

Also, cable and tubing are not always traveling between the same points. For example, both may be feeding an instrument, but the fluid in the tubing may be coming from a fluid source that is remote from the electrical source feeding the cable.

SUMMARY OF THE INVENTION

In accordance with one aspect of the present invention, a support system for industrial tubing is provided which includes a support assembly including lengths of strut channel (sometimes called a "channel strut") and one or more channel clamps secured to the strut channel for fastening the strut channel to a support. In an embodiment, the channel clamps are attached to both ends of a strut channel. In an embodiment, the channel clamp includes a channel containment ledge which covers the open end of the strut channel. In an embodiment, the channel clamp includes a web and two spaced-apart ears bent at an angle from the web.

In an embodiment, at least one support assembly is clamped flush with a face of a support bar. The support bar may be a rectangular, preferably square, tube. Support bars are illustratively welded to webs or flanges of structural I-beams. At least some of the support bars are preferably generally vertical, with the support assembly attached with the strut channel portion thereof extending generally vertically. At least some of the support bars are spaced apart to produce runs between adjacent bars of between about two feet and about twenty feet (about 0.6 to about 6.1 meters). In embodiments of the support assembly, the ears are spaced apart slightly farther than a width of a support bar, to center the support assembly on the support bar. In embodiments, two support assemblies may be positioned on opposing sides of a support bar and held by bolts extending through their webs.

In embodiments, at least the support assemblies are coated with a protective coating. The coating may in certain embodiments cover bolts and nuts attaching the support assemblies. In at least those embodiments, and preferably in all embodiments, the coating should be thin enough not to interfere with threading the nuts onto the bolts, preferably having a thickness no greater than 0.0015" (0.038 mm), preferably no greater than about one mil (0.001" or 0.025 mm or 25 microns). In an embodiment, the coating is a fluoropolymer composite having a thickness no greater than 0.001" (0.025 mm). In an embodiment, the coating is electrically non-conductive and has a thickness of from about 0.0005" to about 0.0009" (about 13-23 μm). In another embodiment, the coating is electrically conductive and has a thickness of about 0.0012"+/−0.0005" (about 17-43 μm), allowing the support assembly to be electrically grounded.

In accordance with another aspect of the present invention, a support system for industrial tubing is provided which includes a support bar supported by an I-beam, at least one generally vertical strut channel attached to the support bar, and a support having a horizontal shelf part and a vertical leg attached to the strut channel. Preferably, the support is removably attached to the strut channel at or near its lower end.

In an embodiment, the support bar is L-shaped and a free end of the leg of the support bar is welded to a web of the I-beam, with a body of the support bar extending downward. The strut channel is attached along the vertical body of the L-shaped support bar. Preferably, strut channels are attached to opposed sides of the body of the L-shaped support bar. The L-shaped support bars are attached to the I-beam at appropriate spacing for supporting process tubing without the tubing's sagging, with the vertical bodies of the support bars hanging down below the lower flange of the I-beam. The strut channels thus also hang down below the I-beam. Turns may be made in open space, utilizing a bending radius appropriate to the tubing.

In another embodiment, the support bar is a straight bar attached to a flange of an I-beam. If attached to an upper flange, the bar may support a strut channel on a front side, a back side, or both, allowing tubing to be supported within the cross-section of the I-beam. If attached to a lower flange, the bar may support the strut channel or strut channels and their supported tubing completely below the flange, protected by the flange. In yet other embodiments, the support bar is U-shaped, with the strut channel mounted on any of its three lengths.

One or more tubing clamps are held by the strut channel and carry individual tubes or tubing bundles. Where multiple clamps are attached to the strut channel, the tubing is carried in vertically spaced runs. Preferably, individual flat tubing bundles are held with the tubes lying generally in a horizontal plane. The clamps allow individual tubes and tubing bundles to be moved upward or downward relative to the support, and allow tubing to be added at any desired vertical position. In an embodiment, the clamps are mounted on generally horizontal shelves which are movably and removably attached to the strut channel. In this embodiment, the clamps may be ties extending through holes in the shelves, or they may be pieces held by bolts or the like to the shelves. In other embodiments the clamps themselves are individually movably and removably attached to the strut channel.

In use, process tubing is illustratively initially supported by the attached shelf while it is strung from one attachment point to another. When it has been placed, appropriate bundles of tubing are lifted to a more compact support, illustratively tubing clamps, where they are clamped to the strut channel.

Other aspects of the invention will be apparent to those skilled in the art in light of the following description of illustrative embodiments of the invention.

All patents and published applications mentioned herein are hereby incorporated by reference.

BRIEF DESCRIPTION OF THE SEVERAL VIEWS OF THE DRAWINGS

In the accompanying drawings which form part of the specification:

FIG. 4 is a view in perspective of tubing support assemblies in accordance with FIGS. 3 and 4, ready to be clamped onto opposed sides of a vertical support bar in accordance with the invention.

FIG. 5 is a view in perspective of a single tubing support assembly of FIGS. 2-4, ready for mounting to a support bar.

FIG. 6 is a view in side elevation of a removable installation bracket part of the support system of FIG. 1.

FIG. 7 is a view in end elevation of the installation bracket of FIG. 6.

DESCRIPTION OF THE PREFERRED EMBODIMENT(S)

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
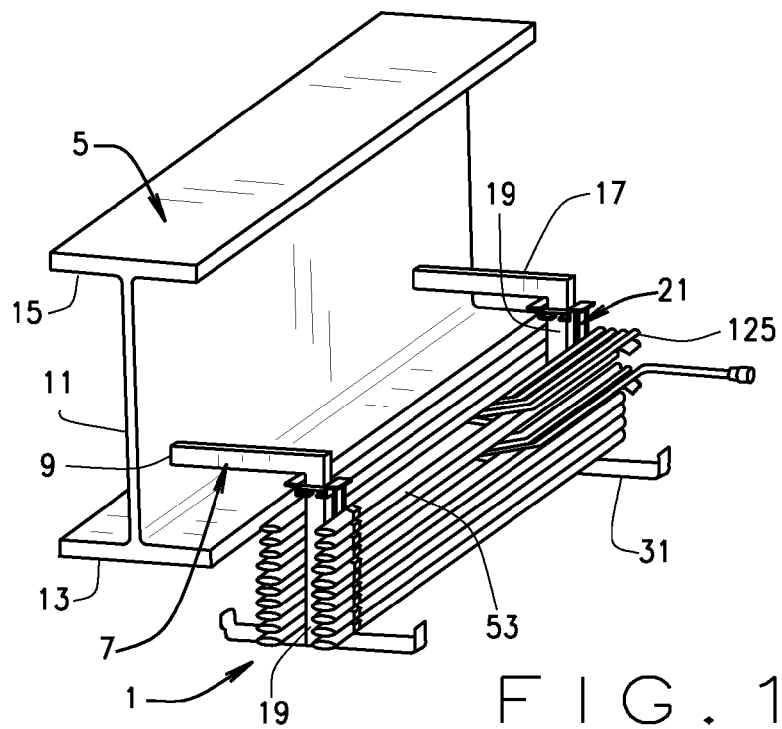
FIG. 1 is a view in perspective of a section of an illustrative embodiment of a tubing support system of the present invention carrying tubing and tubing bundles.

Referring now to the Figures, and in particular FIG. 1, reference numeral 1 indicates a tubing support system of the present invention supporting tubing bundles 53 from a structural I-beam 5. The support system 1 includes a support bar 7, which may be of any appropriate size and shape. In this illustrative embodiment, the support bar 7 is L-shaped, an upper free end 9 being welded to a web 11 of the I-beam 5, between a lower flange 13 and an upper flange 15.

The support bar 7 includes a generally horizontal upper leg 17 and a generally vertical leg 19. The bar 7 is illustratively made of 2" (5.1 cm.) square hollow carbon steel tubing designated as ASTM A500 Grade B and being surface metalized with zinc or painted. The tubing of bar 7 preferably has a wall thickness of about 0.25" (0.6 cm.). The dimensions of the bar are chosen to fit a particular application. A typical illustrative dimension might be 14" (35.5 cm.) long for the upper leg 17 and 18" (45.7 cm.) long for the vertical leg 19. The dimensions are generally chosen to allow supported tubing to extend below the lower flange 13 or else to allow adequate spacing between the web 11 of the I-beam and the vertical leg 19 to position tubing in a protected area within the I-beam, all as described hereinafter. A stop plate 20 is welded to the lower end of the vertical leg 19. The stop plate 20 is illustratively in the form of a disk having a diameter at least about as great as the diagonal dimension of the vertical leg 19.

As shown in more detail in FIGS. 2-5, the support system 1 further includes a support assembly 22 including lengths of strut channel 21 and channel clamps 29. The support assembly is clamped to the inside and/or outside faces of the vertical leg 19 of the support bar 7. In this embodiment, two support assemblies 22 are clamped to inside and outside faces of the vertical leg 19 by bolts 24.

The stop plate 20 of this embodiment forms a support platform which prevents the support system 1, including the strut channel 21 and its clamps 29, from sliding off the vertical leg 19, even if it is not fastened as securely as intended.

The strut channels 21 are preferably from 4" (10 cm.) to 18" (46 cm.) long, illustratively 14" (36 cm) long. The length of the strut channel 21 is generally equal to or slightly less than the length of the vertical bar 19.

Figure 2:
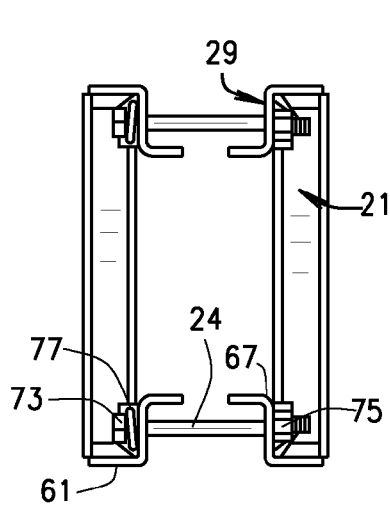
FIG. 2 is a view in end elevation of two support assembly portions of the support of FIG. 1, without tubing or tubing clamps.
Figure 3:
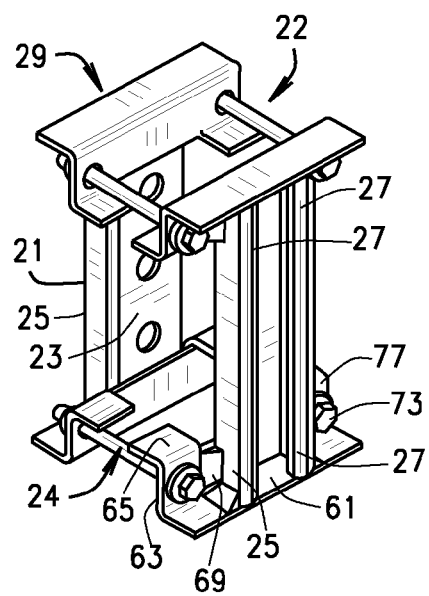
FIG. 3 is a view in perspective of the tubing support assemblies of FIG. 2.

As shown in FIGS. 2 and 3, the strut channels 21 are conveniently standard half-high strut channels having a width of 1⅝" (41 mm) and a height of 13/16" (20.5 mm). As is well known, such strut channels have a web 23 connecting parallel arms 25 having inwardly rolled free ends or lips 27 defining a gap of ⅞" (22.2 mm). The struts 21 are illustratively made of 12-gauge (0.1046" or 1.657 mm thick) stainless steel. Their webs 23 are illustratively slotted, to save weight and to permit drainage.

Each channel clamp 29 is welded to an end of a strut channel 21. The channel clamp 29 includes a channel containment ledge 61, a clamp web 63, and two ears 65. The channel containment ledge 61 is welded as indicated at 67 to the exteriors of strut channel arms 25 to cover the open end of the strut channel 21. The clamp web 63 is perpendicular to the ledge 61. The ledge 61 and web 63 are welded as indicated at 69 to the exteriors of strut channel arms 25 to secure the clamp web 63 flush with the outside of the strut channel web 23. The ears 65, which are generally perpendicular to the clamp web 63, are spaced about 2.05" (5.2 cm) apart, to enable centering the support system 1 over the 2" (5.1 cm) bar 7. Bolt holes 71 are provided in the clamp web 63, between the containment ledge 61 and the ears 65.

The support assembly 22, including the channel 21 and clamps 29, is preferably coated with a thin protective coating material, illustratively a fluoropolymer in a reinforcing polymer binder. An illustrative coating is produced by electrostatically spraying a 0.0007" (0.018 mm) coating of Xylan 1212 (Whitford Corporation, Elverson, Pa., USA) fluoropolymer composite coating. In other embodiments, other composite coatings may be used, illustratively other fluoropolymer composites. For example, where electrical grounding is required, a conductive coating may be applied to a thickness of about 0.0009" (23 μm); exemplary conductive coatings are Xylan 1400RC/873, having a measured resistance of <35K ohms measured on glass coupons @ 0.7 to 0.9 mils (17-23 microns) dry-film thickness, or Xylan 1401 RC/873, having a measured resistance of <11K ohms measured on glass coupons @ 0.7 to 0.9 mils (17-23 microns) dry-film thickness. The Xylan coating prevents electrolytic (galvanic) corrosion when the assembly and support bar are subjected to moisture, particularly salt water spray.

As shown in FIGS. 1-4, two support assemblies may be mounted on opposite sides of a support bar 7 by positioning the assemblies on the stop plate 20 at the bottom of the support bar, running two bolts 24 through the aligned holes 71 in each support assembly, and securing them with a nut 75 and lock washer 77, drawn tight enough to prevent slippage of the assembly under load. The bolts, nuts, and lock washers are also preferably made of stainless steel and coated with Xylan 1212. The lock washers may of course be positioned under the heads 73 of the bolts 24 or under the nuts 75.

When only one support assembly 22 is required, simple angle irons 79 (FIG. 5) may be substituted for the second assembly 22 to save weight and expense. The angle irons 79 include a horizontal reach 81 and a vertical reach 83 with bolt holes 85 in it. In other embodiments, U-bolts are substituted for the angle irons 79 and bolts 24.

The support assemblies, and other such assemblies, may be utilized in accordance with other aspects of the invention.

Removably mounted at the bottom of each of the strut channels 21 is a temporary bracket 31, shown in FIGS. 6 and 7. The temporary bracket 31 is utilized in stringing tubing before the tubing is fixed in place. The bracket 31 may be removed after the tubing is strung, although it need not be removed. The bracket 31 is illustratively made of 11-gauge 316 stainless steel. It includes a generally horizontal shelf 33, having bent-down sides 35, a bent-down inner end wall 37 having a tongue 39 sized to fit between rolled ends 27 of the strut channel 21, and a bent-up outer end wall 41 having hem tabs 43. The inner ends of the bent-down side walls are welded to the bent-down inner end wall 37 for strength. The hem tabs 43 are bent flush with the outer end wall 41 to strengthen it. A bolt 45 extends through the inner end wall 37 for threading into a standard channel nut 47 to lock the bracket 31 to the lower end of the strut channel 21. The shelf 33 is illustratively 8" long and 2" wide, and the bent-up outer wall is illustratively 1.5" tall.

Figure 8:
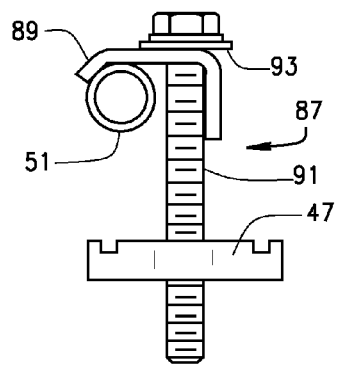
FIG. 8 is a view in side elevation of a known clamp supporting a single tube and forming a part of the support system of FIG. 1.
Figure 9:
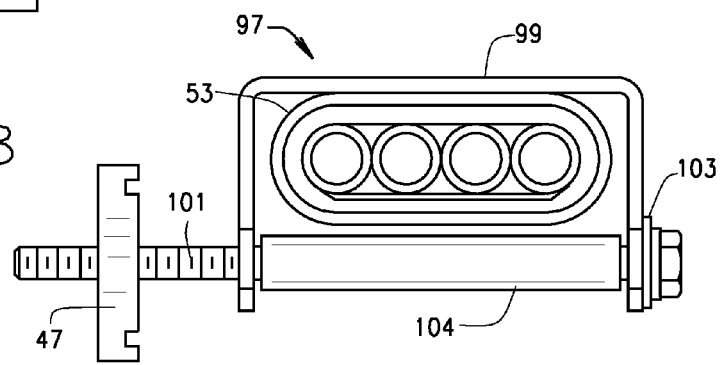
FIG. 9 is a view in side elevation of a known clamp supporting a tubing bundle and forming a part of the support system of FIG. 1.

In final configuration, tubes 51 and tubing bundles 53 are held and supported by clamps or clips, such as the known clips illustrated in FIGS. 8 and 9 and available from O'Brien Corporation/Ametek, St. Louis, Mo.

As shown in FIG. 8, a clip 87 for holding a single tube 51 may comprise a clip body 89, a cap bolt 91, a lock washer 93, and a standard strut channel nut 47. The clip body is shaped at one end to engage and hold a tube 51 and at the other end to prevent overtightening of the clip, thus preventing damage to the tube. The channel nut 47 is turned to fit into the channel 21, then turned 90° to engage the lips 27 of channel 21 when the bolt 91 is tightened.

As shown in FIG. 9, a clip 97 for holding a tubing bundle 53 includes a U-shaped body 99, a cap bolt 101 running through holes in the ears of the body 99, a lock washer 103 under the head of the bolt 101, a channel nut 47, and a sleeve 104 to prevent overtightening of the clip and bending of the ears of the clip body 99. The clip 97 is installed in the channel 21 in the same standard way.

Figure 10:
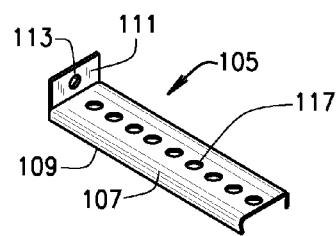
FIG. 10 is a view in perspective of a mounting bracket for use in carrying multiple tubes or tubing bundles at a single height.
Figure 12:
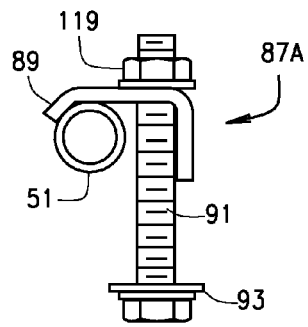
FIG. 12 is a view in side elevation of a clamp corresponding to the clamp of FIG. 8, modified for use with the bracket of FIG. 10.
Figure 14:
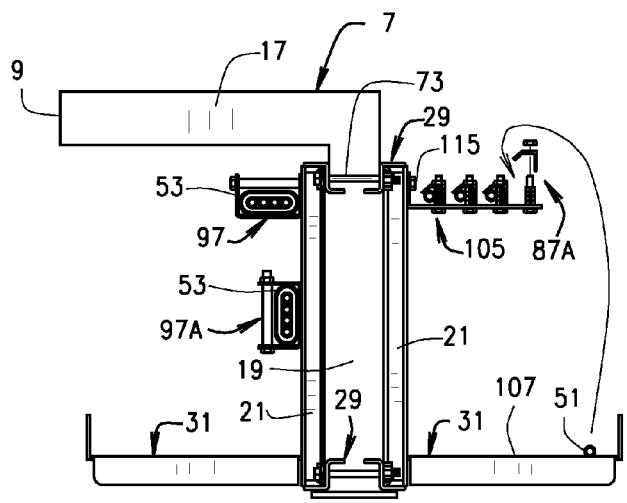
FIG. 14 is a view in side elevation of a pair of tubing support assemblies mounted on a tubing support bar with temporary, removable, installation brackets and tube mounting clips or clamps mounted to them for mounting individual pipes and tubing bundles.

In order to carry more than one tube or tubing bundle at a particular vertical height, a clip bracket may be installed on the channel 21. The bracket includes an arm which has holes or slots to accommodate multiple clips. The bracket may resemble the removable bracket 31, but it preferably is somewhat smaller and lacks the up-turned lip at its outer end. As shown in FIG. 10, a bracket 105 may have a generally horizontal arm 107 having bent-down sides 109, a bent-up inner end wall 111 with a hole 113 in it for a bolt 115 and channel nut, not shown. The arm 107 is provided with threaded holes 117, spaced apart to permit multiple bolts 91 or 101 to be threaded through the arm from the bottom, with their threaded shanks extending upward. As shown in FIGS. 12 and 14, this arrangement allows placement of a tube 53 on the arm 107 adjacent a bolt 91 (which may be given a protective sleeve if desired to protect the tube from the bolt's threads); a clip body 89 is placed on the bolt 91 over the tube 53; and a lock nut 119 is threaded onto the bolt 91 to lock the tube in place relative to the mounting assembly 22.

Figure 11:
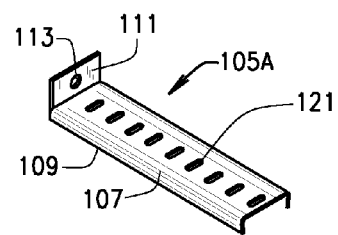
FIG. 11 is a view in perspective of an alternative mounting bracket for use in carrying multiple tubes or tubing bundles at a single height.

As shown in FIG. 11, a bracket 105A extending the number of tubes and tubing bundles at each height may simply include slots 121 in its arm, for use with standard ½" band clamps.

Figure 13:
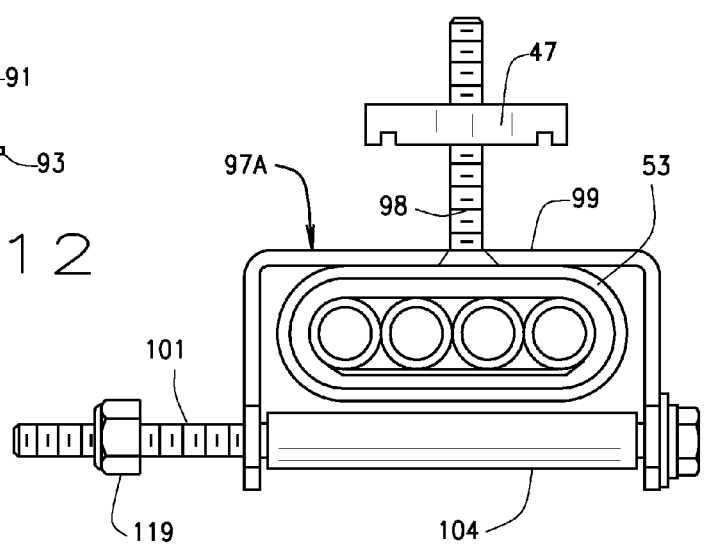
FIG. 13 is a view in side elevation of a clamp corresponding to the clamp of FIG. 9, modified for carrying a tubing bundle with the tubes stacked vertically.

As shown in FIG. 13, the clip 97 of FIG. 9 may be modified to form a clip 97A by providing a bolt 98 extending through the central span of the body 99. The bolt 98 is held to a strut channel with a channel nut 47, and a lock nut 119 is provided on the bolt 101. This arrangement is useful for supporting a tubing bundle with its tubes aligned vertically.

Temporary bracket 31, clips (such as clips 87 and 97), and brackets (such as brackets 105 and 105A) are preferably covered in a heavier plastic coating or jacketing to prevent galvanic corrosion and to protect tubing and workers from sharp edges. The plastic coating may be a thermoplastic material, for example nylon, polyurethane, or polyvinylchloride.

The use of the tubing support system of the invention permits great flexibility in routing and supporting tubing, particularly in an industrial or petroleum extraction platform environment. Because it allows tubing to be supported from horizontal structural members, the tubing can run above most of the cable trays, in space that is currently wasted. Because tubing can typically be supported in spans measured in feet (say three to eight feet between supports, varying by tube diameter and composition) rather than in inches (3-18" for cable), the angled bars 7 can be mounted on the structural members (illustratively I-beams) with fewer supports and in courses that extend more directly from a source of fluid to its point of use.

When the fluid paths of the facility have been determined, the number and size of tubes and tubing bundles being carried can be calculated and their paths established. The size of each support bar may then be determined, with a horizontal leg length ranging from just above the I-beam's flange width up to 24" and the vertical leg length ranging from a few inches to 60", in order to place the tubing runs in the available space and to accommodate the number of tubes and tubing bundles that must be carried. Paths through the facility may be plotted using turning radii appropriate for the tubing and tubing bundles being carried.

The support assemblies, including strut channels 21 and clamps 29, are typically attached to the angled bars after the angled bars 7 are welded to the I-beams 5. They may run up the inner face, the outer face, or both of the vertical bar, and they may extend the entire height of each face or only as far along the face as the vertical extent of the piping to be mounted to them.

After the support bars 7 are placed and the support assemblies 22 are bolted to them, the temporary brackets 31 are bolted to the strut channels 21 to establish supported paths for the tubing.

Some or all of the tubes and tubing bundles may then be run between points of supply and use in the facility, using the temporary brackets for support. Clips, such as clips 87, 97, and clip brackets 105 or 105A appropriate for the tubes and tubing bundles are then inserted into each strut channel 21, in a desired order, maintaining the same order throughout a run. Individual tubes 51 or tubing bundles 53 are then lifted to be supported by the appropriate clip 87, 87A, 97, or 97A in their permanent positions as shown in FIG. 14.

When the tubing and tubing bundles have been placed, they are neatly separated and accessible. Further, individual tubes can be pulled from the tubing bundles by stripping the bundle's jacket and supported by extension clamps as shown at 125 in FIG. 1 or bent and run to a desired end point supported by other supports, as shown at 135 in FIG. 15.

Figure 15:
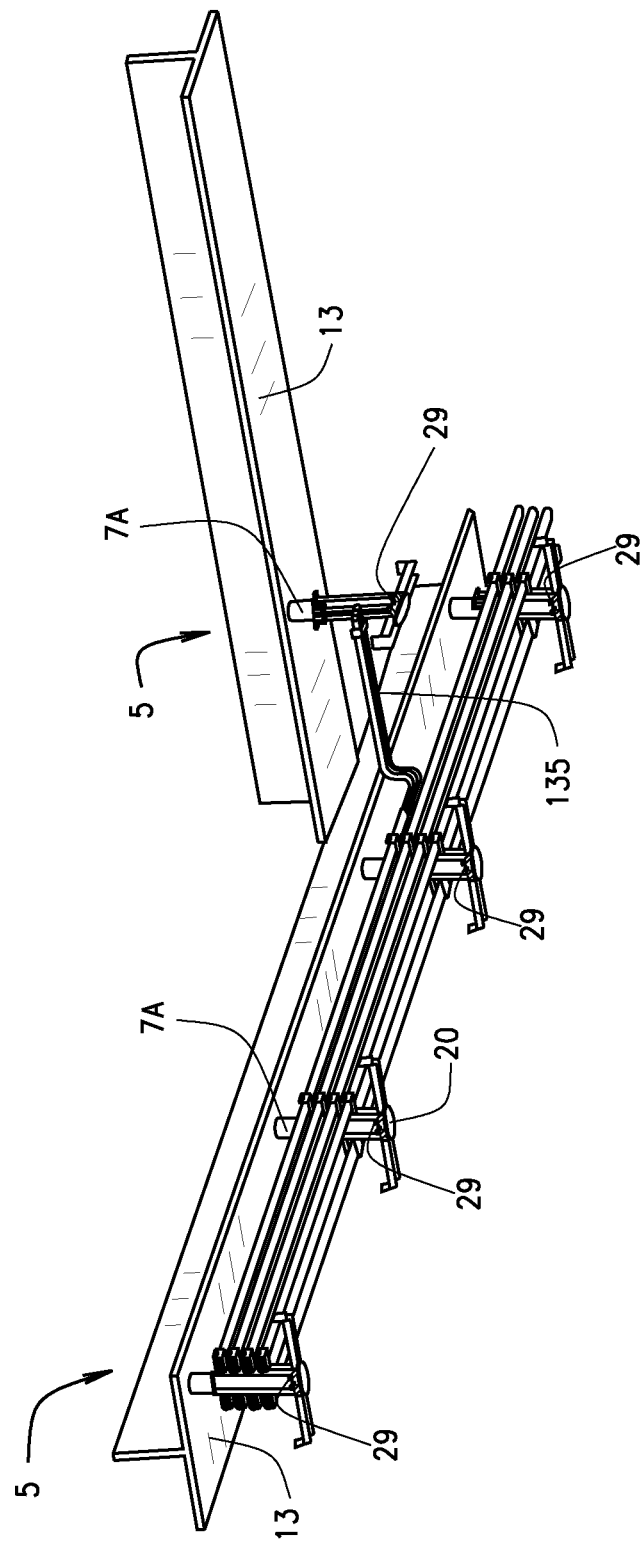
FIG. 15 is a view in perspective of a second embodiment of tubing support system, showing a slightly larger section than the support of FIG. 1.

As shown in FIGS. 1 and 15, the support structure allows free and unsupported lengths of tubing 3 around corners, while supporting the tubing on each side of the turn. It will be seen that the turn can be taken at a radius appropriate to bending the tubing, without disrupting the jacketing of the tubing, and without requiring splicing. If tubing bundles are carried with the tubes in them aligned vertically, lateral turns are easily made on smaller radii, and individual tubes may be taken out and elevated or lowered on tighter radii.

It will be appreciated by those skilled in the art that cable trays 127 (shown diagrammatically in FIG. 16) are traditionally supported some distance below the upper structural elements of a facility; the system of the present invention will therefore typically carry tubing above the cable trays in space that is presently wasted. In some embodiments, the support system allows the process tubing to be carried beneath an upper or lower flange of a supporting I-beam for protection of the tubing from falling objects. Because those flanges may range up to several feet in width, the opportunity to utilize the space between flanges may be beneficial.

Numerous variations in the device and method of the present invention will occur to those skilled in the art in view of the foregoing disclosure.

Merely by way of example, the L-shaped support bars 7 may be replaced by single vertical bars 7A welded to the lower flanges 13 of I-beams 5, as shown in FIG. 15. The bars 7A may also be welded to the upper flange 15 or lower flange 13 of an I-beam to place the support assembly completely or partially within the cross-section of the I-beam, protected by the flanges above and below it. This approach sacrifices some flexibility in positioning the runs of tubing, but simplifies the supports.

Figure 16:
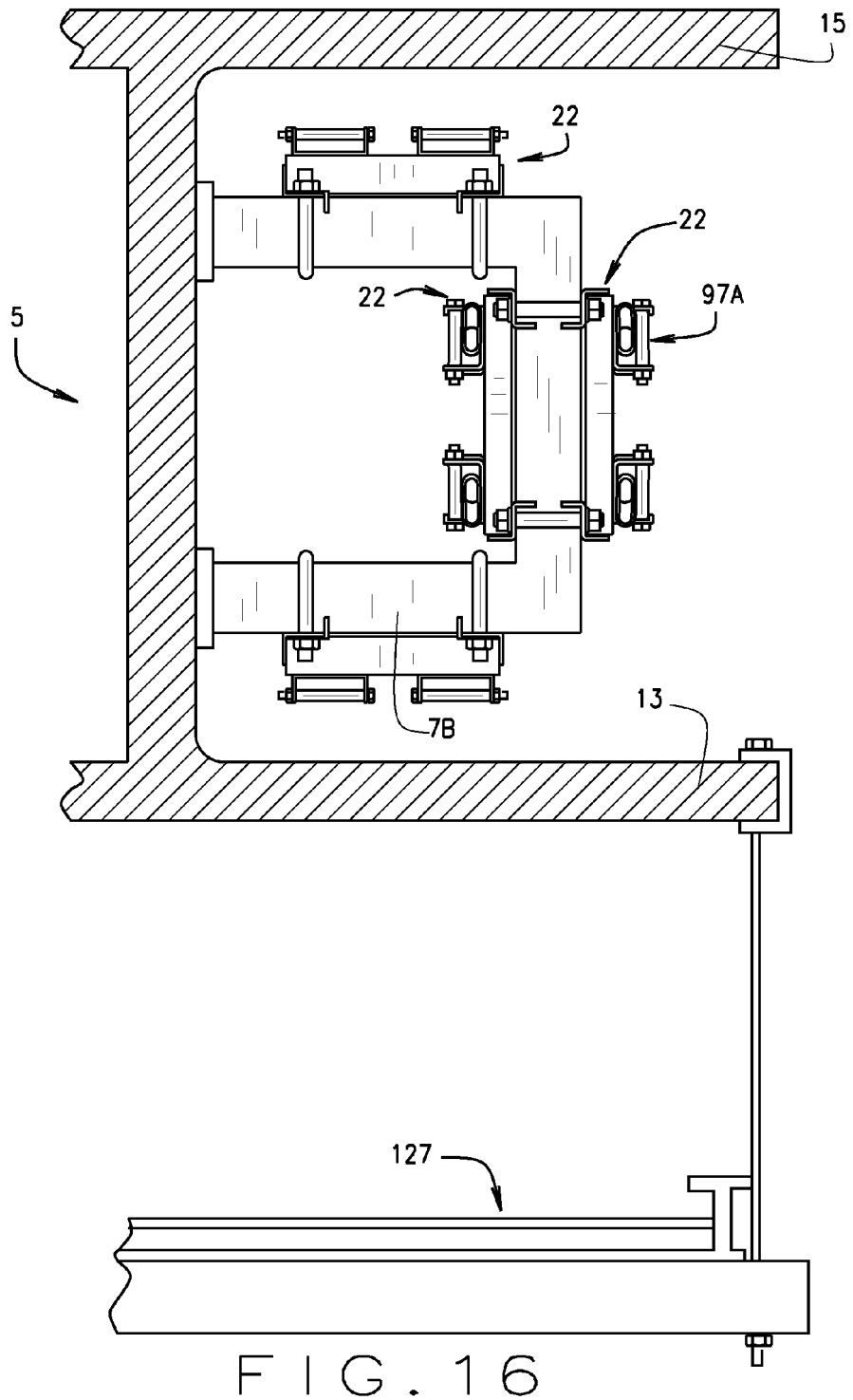
FIG. 16 is a sectional view in side elevation of a third embodiment of tubing support system in accordance with the invention.

Likewise, as shown in FIG. 16, the L-shaped support bars may be replaced by U-shaped supports 7B welded to the web of an I-beam or column. This approach allows up to six support assemblies to be attached, and, if the flanges of the I-beam are broad enough, to be protected by the flanges.

The stop plate 20 may be modified or even omitted if desired, particularly if the support assemblies are oriented horizontally.

When corrosion is not a concern, the fluoropolymer composite coating on the support assemblies may be omitted. In other cases, an anticorrosive joining compound may be applied at points of contact of dissimilar metals to prevent galvanic corrosion.

The bars 7 may be have other than square cross-sections, may be formed of other materials, either solid or hollow, and may be held to structural elements in other ways, such as by clamping. The strut channels 21 may be held to the bars 7 in other ways, such as welding. The temporary support brackets 31 may be made permanent, as by welding them to the strut channels, and may be in different shapes. Different clamps 87 may be utilized.

These variations are merely illustrative.

The invention claimed is:

1. A method of mounting tubing or other linear elements in a facility, the facility comprising a generally horizontal structural support, the method comprising mounting at least two generally vertical sections of strut channel to the structural support, each section of strut channel comprising two elongate parallel arms connected by a web, the parallel arms having inwardly turned free ends defining a gap between the arms, the sections of strut channel being spaced apart a distance of from two feet to twenty feet, mounting at least one linear element support to each strut channel by means of a channel nut engaging the turned ends, and mounting a generally horizontal linear element between the linear element supports.

2. The method of claim 1 wherein the linear element supports comprise generally horizontal support surfaces.

3. The method of claim 1 wherein the vertical sections of strut channel comprise clamps rigidly connected to upper and lower ends of the sections of strut channel, the method further comprising using the clamps to clamp the sections of strut channel to vertical mounting bars.

4. The method of claim 3 further comprising welding the clamps to the sections of strut channel.

5. The method of claim 3 further comprising welding the mounting bars to a structural I-beam.

6. The method of claim 3 further comprising mounting the vertical sections of strut channel on opposed sides of the mounting bars with their respective clamps aligned, and connecting the clamps to each other by tension elements extending from one clamp to the other.

7. The method of claim 1 wherein the step of mounting at least one linear element support to each strut channel comprises mounting a bracket in a lower end of the section of strut channel, the bracket including a generally horizontal shelf sized to support a plurality of tubes or tubing bundles, the method further comprising mounting a plurality of clamps in the strut channel, each said clamp being sized to support at least one of a tube or a tubing bundle above the shelf.

8. The method of claim 7 further comprising a step of supporting said at least a single tube or tubing bundle on the shelf and thereafter moving the at least a single tube or tubing bundle to be supported by one of said clamps.

* * * * *